United States Patent
Fan et al.

(10) Patent No.: US 11,687,242 B1
(45) Date of Patent: Jun. 27, 2023

(54) FPGA BOARD MEMORY DATA READING METHOD AND APPARATUS, AND MEDIUM

(71) Applicant: INSPUR ELECTRONIC INFORMATION INDUSTRY CO., LTD., Shandong (CN)

(72) Inventors: Jiaheng Fan, Shandong (CN); Yanwei Wang, Shandong (CN); Hongwei Kan, Shandong (CN); Rui Hao, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 18/012,921

(22) PCT Filed: Feb. 19, 2021

(86) PCT No.: PCT/CN2021/076885
§ 371 (c)(1),
(2) Date: Dec. 25, 2022

(87) PCT Pub. No.: WO2022/001128
PCT Pub. Date: Jan. 6, 2022

(30) Foreign Application Priority Data

Jun. 30, 2020 (CN) .......................... 202010616628.X

(51) Int. Cl.
*G06F 3/06* (2006.01)
(52) U.S. Cl.
CPC .......... *G06F 3/0608* (2013.01); *G06F 3/0644* (2013.01); *G06F 3/0673* (2013.01)
(58) Field of Classification Search
CPC ..... G06F 3/0608; G06F 3/0644; G06F 3/0673
See application file for complete search history.

(56) References Cited

U.S. PATENT DOCUMENTS

| 11,023,249 B1* | 6/2021 | Corekin .............. G06F 16/1734 |
| 2012/0131253 A1* | 5/2012 | McKnight .......... G06F 13/1668 710/308 |

(Continued)

FOREIGN PATENT DOCUMENTS

| CN | 107122490 A | 9/2017 |
| CN | 109445863 A | 3/2019 |

(Continued)

OTHER PUBLICATIONS

Li Zhang, et al. "Real-time image data transposition method for high-speed digital inkjet." Computer Engineering and Applications, 50(6):35-39, 2014.

(Continued)

*Primary Examiner* — Zhuo H Li
(74) *Attorney, Agent, or Firm* — IPro, PLLC

(57) ABSTRACT

The method includes: an FPGA board feeds back the quantity of controllers and the total quantity of DDR memories after receiving a hardware information acquisition request from a host; after a data space application request is received from the host, on the basis of the data space application request, perform data slice processing on data to be calculated, wherein the data space application request carries the dedicated application space capacity of each DDR and the data to be calculated, and the total quantity of slices of the data to be calculated is the same as the total quantity of DDR memories; and transmit each sliced data to a corresponding DDR space, and according to a data storage position of the sliced data in each DDR, read the data from the DDR memory space in parallel by means of the plurality of controllers and calculate same.

20 Claims, 4 Drawing Sheets

(56) References Cited

U.S. PATENT DOCUMENTS

2015/0178243 A1* 6/2015 Lowery .............. G06F 12/0692
                                                    709/212
2016/0357668 A1* 12/2016 Renes ................... G06F 9/4887
2018/0059939 A1   3/2018 He et al.

FOREIGN PATENT DOCUMENTS

| CN | 110515727 A | 11/2019 |
| CN | 110908797 A | 3/2020 |
| CN | 111143272 A | 5/2020 |
| CN | 111858038 A | 10/2020 |
| WO | 2017181853 A1 | 10/2017 |

OTHER PUBLICATIONS

CN 202010616628.X first office aciton and search report.

* cited by examiner

FPGA BOARD MEMORY DATA READING METHOD AND APPARATUS, AND MEDIUM

CROSS-REFERENCE TO RELATED APPLICATION

The present disclosure claims the priority of the Chinese patent application filed on Jun. 30, 2020 before the CNIPA, China National Intellectual Property Administration with the application number of CN202010616628.X and the title of "FPGA BOARD MEMORY DATA READING METHOD AND APPARATUS, AND MEDIUM", which is incorporated herein in its entirety by reference.

FIELD

The present application relates to the technical field of data access and, more particularly, to a method, device and computer-readable storage medium for reading memory data of a field programmable gate array (FPGA) board.

BACKGROUND

With the increasing demand for data processing efficiency, multi-threaded parallel data processing has become a hot issue. FPGA is a semi-custom circuit developed based on programmable array logic (PAL), general array logic (GAL) and other programmable devices, which not only solves the shortage of custom circuit, but also overcomes the shortcomings of the limited quantity of gate circuits of the original programmable devices. The FPGA device is a semi-custom circuit in an application-specific integrated circuit, and is a programmable logic array, which includes a programmable input/output unit, a configurable logic block, a digital clock management module, an embedded block RAM, a wiring resource, an embedded dedicated hard core, and an underlying embedded functional unit. FPGA has been widely used in the field of digital circuit design because of its abundant wiring resources, high level of repeatable programming and integration, and low investment. A heterogeneous computing platform composed of a FPGA board, a central processing unit (CPU), a graphics processing unit (GPU) and other processors may greatly improve the efficiency and performance of data processing, especially complex data processing process, and is widely used in all walks of life.

An open computing language (Opencl) is a framework for programming heterogeneous platforms, which consists of a language for writing Kernels (kernel function) based on C99 and a set of application programming interfaces (APIs) for defining and controlling the platform, Kernels is a function running on Opencl apparatuses, and Opencl provides a parallel computing mechanism based on task segmentation and data segmentation.

Opencl is divided into two parts, one is a program on the host end, and the other is a Kernel program on the FPGA side. The program steps on the host end are as follows:

applying for a memory on the FPGA board through the following functions DDR0→BUFF as shown in FIG. 1, buff=clCreateBuffer(context, CL_MEM_READ_ONLY, 1G, NULL, &status);

invoking the following functions to copy the calculation data on the host end to the memory of the FPGA board through direct memory access (DMA), as shown in FIG. 1, the data OPENCL→BUFF of the host is copied to the FPGADDR0→BUFF:

status=clEnqueueWriteBuffer(queue, buff0, CL_FALSE, 0, 1G, data, 0, NULL, &write_event[0]);

the address where the FPGA board stores the calculated data is transmitted to Kernel via the parameter status and the Kernel program on the FPGA side is executed:

status=clSetKernelArg(Kernel, buff, sizeof(structbuff), buf).

The result on double data rate (DDR) stored in FPGA board memory is read by the following function:

clEnqueueReadBuffer(queue, output_buf, CL_FALSE, 0, 1G, output[i], 1G, &Kernel event, &finish event);

In the related art, in combination with the feature shown in FIG. 1, data is stored in a memory of a DDR0 of a FPGA board, when reading data, the FPGA board reads the data through one of its own DDR controllers, while the other DDR memories and DDR controllers are idle, and the data reading speed of the FPGA board is not high and the resource utilization rate is poor.

In view of this, how to improve the reading data efficiency and resource utilization rate of a FPGA board is a technical problem to be solved by a person skilled in the art.

SUMMARY

The present application provides a method, device and computer-readable storage medium for reading memory data of a FPGA board, which effectively improves the reading data efficiency and resource utilization rate of the FPGA board, thereby improving the overall operating efficiency and reducing the data processing delay of the system.

In order to solve the above technical problem, embodiments of the present application provide the following technical solutions:

an aspect of an embodiment of the present application provides a method for reading memory data of a FPGA board, which is applied to the FPGA board, including:

sending a quantity of controllers and a total quantity of DDR memories to a host end when receiving a hardware information acquisition request of the host end;

performing data slice processing on data to be calculated based on a data space application request when the data space application request of the host end is received; wherein the data space application request carries a dedicated application space capacity of each DDR and the data to be calculated, and a total quantity of slices of the data to be calculated is not greater than the total quantity of the DDR memories; and transmitting each slicing data into a corresponding DDR space, and reading data and calculating same in parallel according to a data storage position of the slicing data in each DDR.

In an embodiment, performing data slice processing on the data to be calculated based on the data space application request includes:

reading a dedicated application space capacity of each DDR from the data space application request;

determining whether the dedicated application space capacity of each DDR is same;

on a condition that the dedicated application space capacity of each DDR is the same, equally dividing the data to be calculated into n parts, wherein n is a total quantity value of the DDR memories;

on a condition that the dedicated application space capacity of each DDR is not the same, for the dedicated application space capacity of each DDR, cutting the data to be calculated into a data slice with a same value as the dedicated application space capacity of the current slicing of DDR, and setting identification information for the data slice to identify that the data in the data slice is stored in the memory space of the current slicing of DDR.

In an embodiment, transmitting each slicing data to the corresponding DDR space includes:

transmitting each slicing data to the corresponding DDR space through direct memory access.

In an embodiment, transmitting each slicing data into the corresponding DDR space, and reading data and calculating the same in parallel according to the data storage position of the slicing data in each DDR includes:

transmitting each slicing data to the corresponding DDR space, so that each DDR space transmits a structure address stored in a data source to a Kernel; and invoking the Kernel to read corresponding data in parallel according to a data storage address on each DDR for calculation The embodiments of the present application also provide a reading device memory data of a FPGA board, which is applied to the FPGA board, including:

a data feedback module configured for sending a quantity of controllers and a total quantity of DDR memories to a host end when receiving a hardware information acquisition request of the host end;

a data slice module configured for performing data slice processing on data to be calculated based on a data space application request when the data space application request of the host end is received; wherein the data space application request carries a dedicated application space capacity of each DDR and the data to be calculated, and a total quantity of slices of the data to be calculated is not greater than the total quantity of the DDR memories;

a data storage module configured for transmitting each slicing data to a corresponding DDR space; and a data reading module configured for reading data and calculating same in parallel according to a data storage position of the slicing data in each DDR.

In an embodiment, the data slice module includes:

an information reading sub-module configured for reading a dedicated application space capacity of each DDR from a data space application request;

a determination sub-module configured for determining whether the dedicated application space capacity of each DDR is same;

an averaging slicing sub-module configured for, on a condition that the dedicated application space capacity of each DDR is the same, equally dividing the data to be calculated into n parts, wherein n is a total quantity value of the DDR memories;

a matching slicing sub-module configured for, on a condition that the dedicated application space capacity of each DDR is not the same, for the dedicated application space capacity of each DDR, cutting the data to be calculated into a data slice with a same value as the dedicated application space capacity of the current slicing of DDR, and setting identification information for the data slice to identify that the data in the data slice is stored in the memory space of the current slicing of DDR.

In an embodiment, the data reading module includes:

an address feedback sub-module configured for transmitting each slicing data to the corresponding DDR space, so that each DDR space transmits a structure address stored in a data source to a Kernel; and a data parallel reading sub-module configured for invoking the Kernel to read corresponding data in parallel according to a data storage address on each DDR for calculation.

Another aspect of an embodiment of the present application provides a method for reading memory data of a FPGA board, which is applied to a host end, including:

acquiring a quantity of controllers and a total quantity of DDR memories of the FPGA board;

determining a dedicated application space capacity of each DDR based on the total quantity of the DDR memories and the quantity of the controllers; and invoking a data request function of an Opencl to send a data space application request to the FPGA board, wherein the data space application request carries a dedicated application space capacity of each DDR and data to be calculated, so that the FPGA board performs data slice processing on the data to be calculated and stores a corresponding DDR space.

Embodiments of the present application also provide a reading device memory data of a FPGA board, which includes a processor for carrying out the steps of the method for reading memory data of a FPGA board according to any of the preceding claims when executing a computer program stored in the memory.

Finally, embodiments of the present application also provide a computer-readable storage medium, wherein the computer-readable storage medium has stored thereon a program for reading memory data of a FPGA board, and when the program for reading memory data of a FPGA board is executed by a processor, the steps of the method for reading memory data of a FPGA board according to any one of the preceding claims are implemented.

The advantages of the technical solution provided in the present application are: the method of Opencl on the memory of an application FPGA board is changed, the calculation data is sliced, and then the data is copied to the corresponding DDR memory space of the FPGA board, the advantages of the FPGA board supporting multi-DDR control and its parallel processing are made full use of, multiple DDR controllers simultaneously read the data to be calculated, effectively improving the data reading efficiency, maximizing the use of existing software and hardware resources, improving the resource utilization, thereby improving the overall operating efficiency and reducing the system data processing delay.

Furthermore, the embodiments of the present application also provide a corresponding implementation device and a computer-readable storage medium for a method for reading memory data of a FPGA board, further making the method more practical, and the device and the computer-readable storage medium have corresponding advantages.

It should be understood that the general description above and the detailed description below are indicative only and do not limit the present disclosure.

BRIEF DESCRIPTION OF THE DRAWINGS

In order to more clearly explain the technical solution in the embodiment or the existing technology of the present disclosure, the following will briefly introduce the drawings that need to be used in the embodiment or the existing technology description. Obviously, the drawings in the following description are only the embodiment of the present disclosure. For a person skilled in the art, other drawings may be obtained according to the provided drawings without paying creative labor.

DETAILED DESCRIPTION OF THE EMBODIMENTS

In order that a person skilled in the art may understand the technical solution better in the present disclosure, a more complete description of the embodiments of the present disclosure will be rendered by reference to the appended drawings, which are provided for purposes of illustration and are not intended to be exhaustive of or limiting the present disclosure. All the other embodiments obtained by a person of ordinary skill in the art based on the embodiments in the present application without involving any inventive effort shall fall within the scope of the present application.

The terms 'first', 'second', ' third', 'fourth', etc. in this Application Statement and Claim and in the above drawings are used to distinguish between different objects, not to describe a particular order. Furthermore, the terms 'include' and 'have' and any deformation of them is intended to cover non-exclusive inclusion. For example, processes, methods, systems, products or equipment that contain a series of steps or units are not limited to the listed steps or units, but may include unlisted steps or units.

After introducing the technical scheme of the embodiment of the present disclosure, the various non-restrictive implementation methods of the application are described in detail below.

Figure 2:
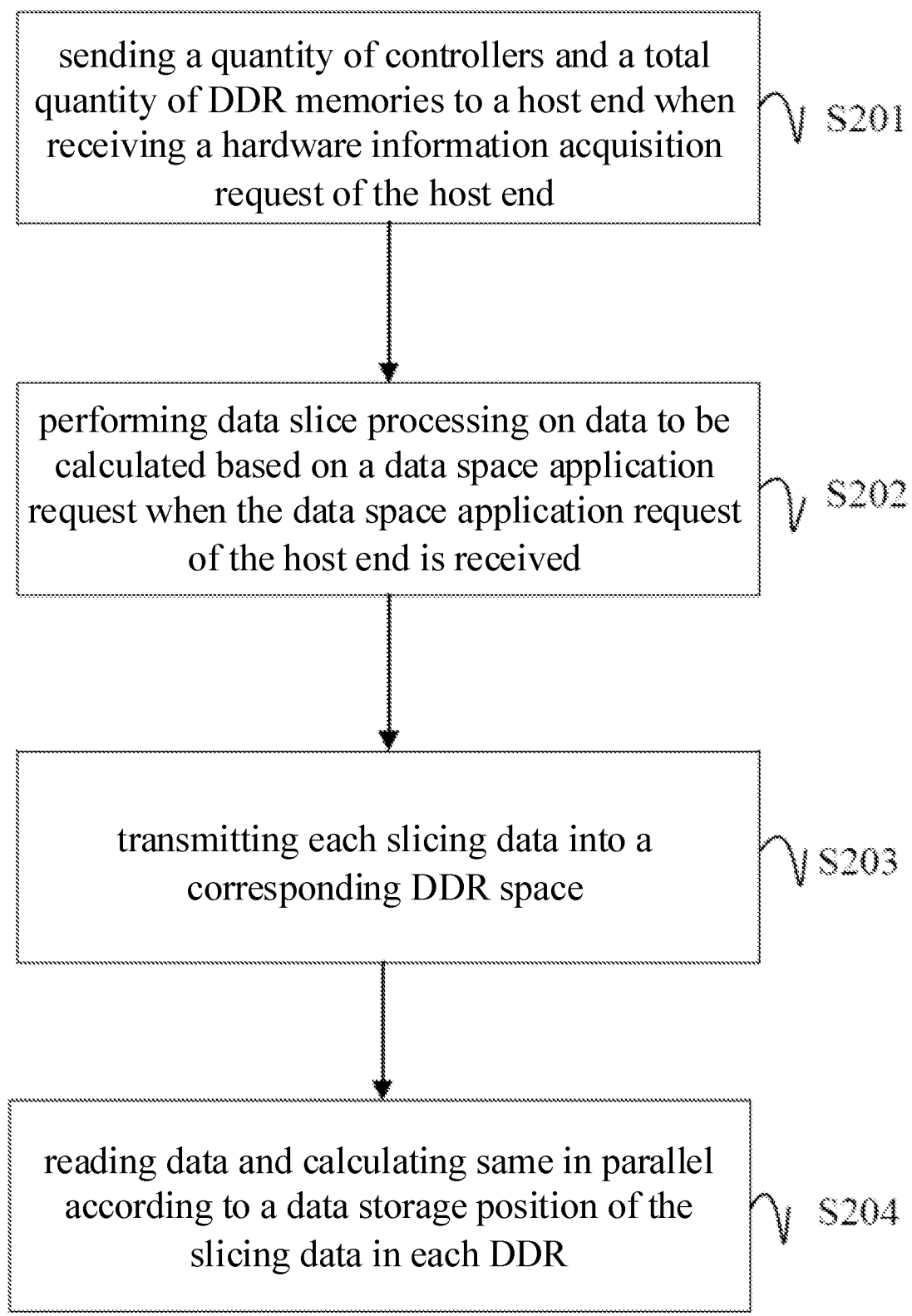
FIG. 2 is a flow chart illustrating a method for reading memory data of a FPGA board according to an embodiment of the present application.
Figure 3:
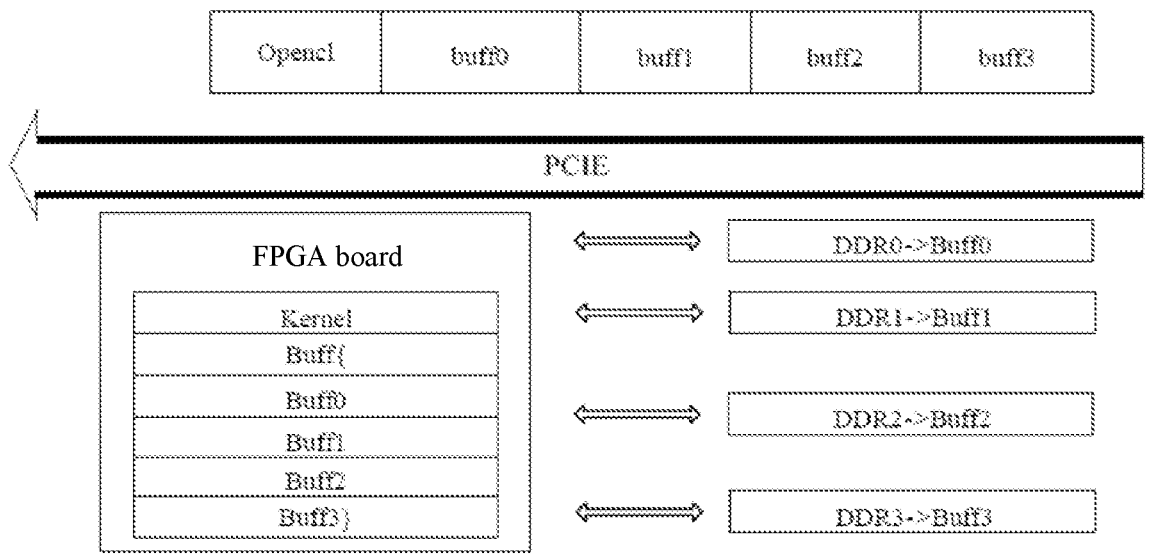
FIG. 3 is an interaction schematic diagram of a method for reading memory data in a FPGA board according to an embodiment of the present application.

Firstly, referring to FIGS. 2 and 3, FIG. 2 is a flow diagram of a method for reading memory data of a FPGA board provided by an embodiment of the present application, and an execution subject of the embodiment of the present application is a FPGA board, which may include the following contents:

S201: sending a quantity of controllers and a total quantity of DDR memories to a host end when receiving a hardware information acquisition request of the host end.

It may be understood that in a heterogeneous computing platform composed of a host end and a FPGA board, the host end is responsible for scheduling, the FPGA board is responsible for computing data processing, the host end needs to send data to be calculated to the FPGA board, and the FPGA board feeds back the data processing structure to the host end after finishing computing processing these data to be computed. Since the present application aims to improve data reading efficiency by changing the storage mode of data to be calculated in an FPGA board, before sending the data to be calculated of the FPGA board, hardware information about the FPGA board which constitutes a heterogeneous computing platform needs to be acquired at a host end, wherein the hardware information includes the total quantity of DDR memories and the total quantity of controllers on the FPGA board, in general, one controller controls to read data of one DDR memory.

S202: performing data slice processing on data to be calculated based on a data space application request when the data space application request of the host end is received.

In the present application, after receiving the hardware information fed back by the FPGA board, the host end needs to apply to the FPGA board for a storage space containing the data to be calculated, and these data to be calculated is stored in the same storage space in the related art, so that the read data is controlled by a controller, and other memory spaces are not used and the controller is also free, with serious waste of resources. According to the present application, based on the quantity of controllers, the total quantity of DDR memories and the capacity calculation of the space occupied by the data to be calculated, a FPGA board is applied by the host end for the capacity calculation of the space occupied by separately storing the data to be calculated in a plurality of pieces of DDR memories, i.e., a dedicated application space capacity of each DDR is calculated, wherein the dedicated application space capacity of each DDR is used for storing a corresponding portion of the data to be calculated. When sending a data space application request to the FPGA board, the host end will carry the dedicated application space capacity of each DDR and the data to be calculated in the request, so that the FPGA board specifies the data to be calculated to be processed and the storage requirements thereof. In this step, the data to be calculated may be evenly divided into all the DDRs in the FPGA board and may also be stored in several DDRs therein, which is not limited in any way in the present application. Accordingly, when the FPGA board slices the data to be calculated, the total quantity of slices of the data to be calculated is not greater than the total quantity of DDR memories.

S203: transmitting each slicing data to a corresponding DDR space.

In S202, after the data to be calculated is divided into a plurality of sub-data or data slices, each slicing data may be transmitted into a corresponding DDR space through a direct memory access DMA.

S204: reading data and calculating same in parallel according to the data storage position of the slicing data in each DDR.

In S203, after storing each data slice in the corresponding DDR memory space, the FPGA board needs to know the storage position to read these data; each DDR space may transmit the structure address stored in the data source, i.e., the storage position of the data slice, to the Kernel; and the FPGA board may acquire the storage position information about each data slice of the data to be calculated from the Kernel, and in an embodiment, the data storage position of each data slice may carry identification information about the data to be calculated and identification information about a corresponding DDR. Since the hardware of the FPGA board supports multiple DDR controllers, and the FPGA board has the capability of processing data in parallel, it is possible to read data on the DDR memory through multiple DDR controllers at the same time, and the Kernel is invoked to read corresponding data through a corresponding controller in parallel according to the data storage address on each DDR and process the data to be calculated based on calculation requirements.

In the technical solution provided by the embodiments of the present application, the method of Opencl on the memory of an application FPGA board is changed, the calculation data is sliced, and then the data is copied to the corresponding DDR memory space of the FPGA board, the advantages of the FPGA board supporting multi-DDR control and its parallel processing are made full use of, multiple DDR controllers simultaneously read the data to be calculated, effectively improving the data reading efficiency, maximizing the use of existing software and hardware resources, improving the resource utilization, thereby improving the overall operating efficiency and reducing the system data processing delay.

In the above-mentioned embodiment, there is no limitation on how to perform step S202, and this embodiment provides a data slice method, which may include the following steps:

The FPGA board reads a dedicated application space capacity of each DDR from the data space application request. Determining whether the dedicated application space capacity of each DDR is same. On a condition that the dedicated application space capacity of each DDR is the same, equally dividing the data to be calculated into n parts, wherein n is a total quantity value of the DDR memories. On a condition that the dedicated application space capacity of each DDR is not the same, for the dedicated application space capacity of each DDR, cutting the data to be calculated into a data slice with a same value as the dedicated application space capacity of the current slicing of DDR, and setting identification information for the data slice.

It should be noted that there is no strict sequential execution order among the steps in the present application, and as long as the logical order is satisfied, these steps may be executed simultaneously, and may also be executed in a certain pre-set order; and FIGS. 2 and 3 are merely schematic modes and do not represent only such an execution order.

In an embodiment of the present application, the identification information is used for identifying that the data in the data slice is stored in the memory space of the current slice DDR, and based on the identification information about the data slice, it may be known in which memory space of the DDR the data slice is stored. The data to be calculated may be evenly divided into all the DDRs, or may be divided into less than the total quantity of slices of the DDR based on the data processing logic of the data to be calculated, not all the memory space of all the DDRs is occupied, and the occupied space capacity of each DDR memory space is also different. For example, on the condition that the step B and the step C of the data to be calculated share the same multiple parameter values, the calculation data implementing the step B and the step C may be placed in the same data slice, and on the condition that the calculation result of the step A of the data to be calculated is the input of the step D, the calculation data implementing the step A and the step D may be placed in the same data slice. In another embodiment, in order to ensure the storage balance of memory data in each DDR, when calculating the dedicated application space capacity of each DDR, each DDR may be sorted according to the available space from large to small, wherein the dedicated application space capacity of the DDR with a large available space is larger, and the dedicated application space capacity of the DDR with a small available space is smaller to ensure the storage balance of each DDR memory space.

In addition, the present application also provides a method for reading memory data of a FPGA board, based on a host end, and with reference to FIG. 3, including:

acquiring a quantity of controllers and a total quantity of DDR memories of the FPGA board;

determining a dedicated application space capacity of each DDR based on the total quantity of the DDR memories and the quantity of the controllers; and invoking a data request function of an Open Computing Language Opencl to send a data space application request to the FPGA board, wherein the data space application request carries a dedicated application space capacity of each DDR and data to be calculated, so that the FPGA board performs data slice processing on the data to be calculated and stores a corresponding DDR space.

The implementation of the method for reading memory data of a FPGA board according to an embodiment of the present application may refer to the relevant description of the above-mentioned method embodiment, which will not be described in detail herein.

It may be seen from the above that the embodiments of the present application effectively improve the reading data efficiency and resource utilization rate of a FPGA board, thereby improving the overall operating efficiency and reducing the system data processing delay.

In order to make a person skilled in the art more clearly understand the technical solution of the present application, the present application also provides a schematic example: on the condition that the capacity of the space occupied by the data to be calculated is 1G, there are 4 DDR memories and 4 controllers on the FPGA board, and the reading process of the memory data of the FPGA board may include:

A: since there are 4 DDR memory data, the corresponding calculation data may be divided into 4 groups equally, and the memory structure shown below is created:

struct buff
{
buff0;
buff1;
buff2;
buff3;
}

B: according to the total amount of space occupied by the data to be calculated/the quantity of DDR memories=the size of a data packet to be applied for by each DDR memory (dedicated application space capacity), 1G/4 (4 DDR memories)=256M, so that an independent 256M memory space is applied for on each DDR of the FPGA board, and a function of Opencl is invoked to apply for a data space.

buff0=clCreateBuffer(context, CL_MEM_READ_ONLY, 256M, NULL, &status, ddr0);
buff1=clCreateBuffer(context, CL_MEM_READ_ONLY, 256M,
    NULL, &status, ddr1);
buff2=clCreateBuffer(context, CL_MEM_READ_ONLY, 256M,
    NULL, &status, ddr2);
buff3=clCreateBuffer(context, CL_MEM_READ_ONLY, 256M,
    NULL, &status, ddr3).

C: the 1G data to be calculated on the host end is divided into 4 pieces of 256M each, and is respectively stored in each memory of the FPGA board.

status=clEnqueueWriteBuffer(queue, buff0, CL_FALSE, 0, 256M, data, 0, NULL, &write_event[0]);
status=clEnqueueWriteBuffer(queue, buff1, CL_FALSE, 0, 256M,
    data, 0, NULL, &write_event[0]);
status=clEnqueueWriteBuffer(queue, buff2, CL_FALSE, 0, 256M,
    data, 0, NULL, &write_event[0]);
status=clEnqueueWriteBuffer(queue, buff3, CL_FALSE, 0, 256M, data, 0, NULL, &write_event[0]);

D: the address of the structure stored in the data source, BUFF, is transmitted to Kernel. The Kernel of the FPGA then reads the data in parallel according to the data address stored on each DDR. Finally, the data is calculated and processed.

status=clSetKernelArg(Kernel[i], buff, sizeof(struct buff), buf).

Figure 1:
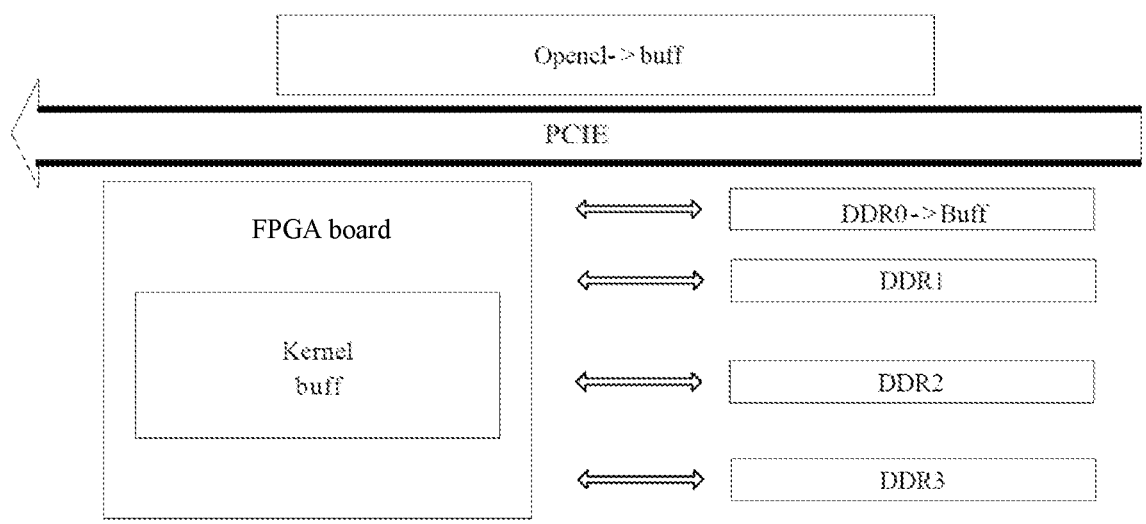
FIG. 1 is a schematic diagram of data reading for an exemplary application scenario in the prior art provided by an embodiment of the present application.

From the above, it may be seen that the embodiment of the present application changes the manner of an Opencl on the application of a FPGA memory, firstly the calculation data is sliced, and then the data is copied to each memory of the FPGA board respectively to improve the efficiency of reading data by 4 times compared with the prior art shown in FIG. 1.

Embodiments of the present application also provide a corresponding apparatus for a method for reading memory data of a FPGA board, further making the method more practical. The reading device may be introduced for the memory data of the FPGA board provided by the embodiments of the present application from the perspective of the functional modules of the FPGA board, and the reading device for the memory data of the FPGA board described below and the reading method for the memory data of the FPGA board described above may be referred to correspondingly.

Figure 4:
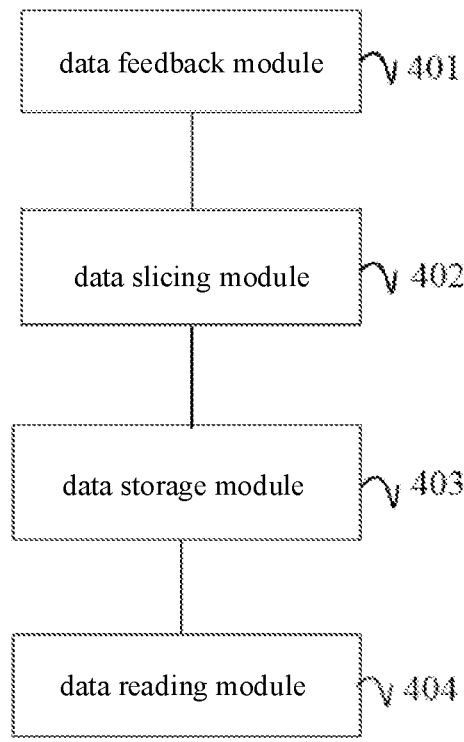
FIG. 4 is a structural diagram of an embodiment of a reading device memory data of a FPGA board according to an embodiment of the present application.

Based on the perspective of functional modules, reference may be made to FIG. 4, which is a structural diagram of a reading device memory data of a FPGA board provided by an embodiment of the present application in a particular embodiment, and based on the FPGA board, the apparatus may include:

a data feedback module 401 configured for sending a quantity of controllers and a total quantity of DDR memories to a host end when receiving a hardware information acquisition request of the host end;

a data slice module 402 configured for performing data slice processing on data to be calculated based on a data space application request when the data space application request of the host end is received; wherein the data space application request carries a dedicated application space capacity of each DDR and the data to be calculated, and a total quantity of slices of the data to be calculated is not greater than the total quantity of the DDR memories;

a data storage module 403 configured for transmitting each slicing data to a corresponding DDR space; and a data reading module 404 configured for reading data and calculating same in parallel according to the data storage position of the slicing data in each DDR.

In some embodiments of the present embodiment, the data slice module 402 may include:

an information reading sub-module configured for reading a dedicated application space capacity of each DDR from a data space application request;

a determination sub-module configured for determining whether the dedicated application space capacity of each DDR is the same;

an averaging slicing sub-module configured for on a condition that the dedicated application space capacity of each DDR is the same, equally dividing the data to be calculated into n parts, wherein n is a total quantity value of the DDR memories;

a matching slicing sub-module configured for, on a condition that the dedicated application space capacity of each DDR is not the same, for the dedicated application space capacity of each DDR, cutting the data to be calculated into a data slice with a same value as the dedicated application space capacity of the current slicing of DDR, and setting identification information for the data slice to identify that the data in the data slice is stored in the memory space of the current slicing of DDR.

In other implementations of the embodiments of the present application, the data storage module 403 may also be a module that transmits each slicing data to the corresponding DDR space through direct memory access.

In other embodiments of the present embodiment, the data reading module 404 may further include, for example:

an address feedback sub-module configured for transmitting each slicing data to the corresponding DDR space, so that each DDR space transmits a structure address stored in a data source to a Kernel;

a data parallel reading sub-module configured for invoking the Kernel to read corresponding data in parallel according to a data storage address on each DDR for calculation.

The functions of each functional module of the device for reading memory data of a FPGA board according to an embodiment of the present application may be implemented according to the method in the above-mentioned method embodiment, and the implementation process thereof may be referred to the relevant description of the above-mentioned method embodiment and will not be described in detail herein.

It may be seen from the above that the embodiments of the present application effectively improve the reading data efficiency and resource utilization rate of a FPGA board, thereby improving the overall operating efficiency and reducing the system data processing delay.

Figure 5:
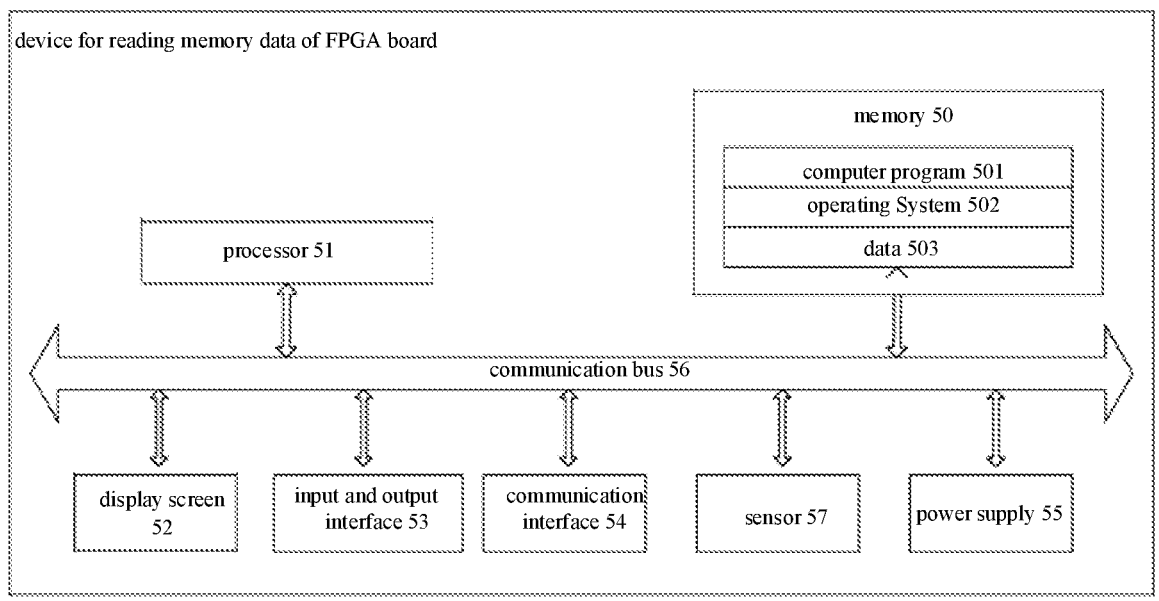
FIG. 5 is a structural diagram showing another embodiment of a reading device memory data of a FPGA board according to an embodiment of the present application.

The above-mentioned device for reading memory data of a FPGA board is described from the perspective of functional modules of the FPGA board, and furthermore, the present application also provides a device for reading memory data of a FPGA board, which is described from the perspective of host end hardware. FIG. 5 is a structural diagram of another memory data of a FPGA board reading device according to an embodiment of the present application. As shown in FIG. 5, the device includes a memory 50 for storing a computer program;

a processor 51 configured for carrying out the steps of the method for reading memory data of a FPGA board as mentioned in any of the above embodiments when executing a computer program.

Among other things, processor 51 may include one or more processing cores, such as a 4-core processor, an 8-core processor, etc. The processor 51 may be implemented in hardware in the form of at least one of digital signal processing (DSP) and programmable logic array (PLA). The processor 51 may also include a main processor and a co-processor, wherein the main processor is a processor for processing data in a wake-up state, and is also called a CPU; a coprocessor is a low-power processor for processing data in a standby state. In some embodiments, the processor 51 may be integrated with a GPU, and the GPU is responsible for rendering and drawing the content required to be displayed on the display screen. In some embodiments, the processor 51 may also include an artificial intelligence (AI) processor for processing computing operations related to machine learning.

The memory 50 may include one or more computer-readable storage mediums, which may be non-transitory. The memory 50 may also include high speed random access memory, as well as non-volatile memory, such as one or more magnetic disk storage apparatuses, flash memory storage apparatuses. In the present embodiment, the memory 50 is at least used for storing a computer program 501 which, after being loaded and executed by the processor 51, is capable of carrying out the relevant steps of the method for reading memory data of a FPGA board as disclosed in any of the preceding embodiments. In addition, the resources stored by the memory 50 may also include an operating system 502 and data 503, etc. and the storage may be transient or permanent. Among other things, the operating system 502 may include Windows, Unix, Linux, etc. Data 503 may include, but is not limited to, data corresponding to test results, etc.

In some embodiments, the memory data of a FPGA board reading device may further include a display screen 52, an input and output interface 53, a communication interface 54, a power supply 55, and a communication bus 56.

It will be appreciated by a person skilled in the art that the arrangement shown in FIG. 5 does not constitute a limitation on the reading device the memory data of the FPGA board, and may include more or fewer assemblies than those shown, for example the sensor 57.

The functions of each functional module of the device for reading memory data of a FPGA board according to an embodiment of the present application may be implemented according to the method in the above-mentioned method embodiment, and the implementation process thereof may be referred to the relevant description of the above-mentioned method embodiment and will not be described in detail herein.

It may be seen from the above that the embodiments of the present application effectively improve the reading data efficiency and resource utilization rate of a FPGA board, thereby improving the overall operating efficiency and reducing the system data processing delay.

It will be understood that if the reading method of the memory data of the FPGA board in the above embodiment is implemented in the form of a software functional unit and sold or used as a separate product, it may be stored in a computer-readable storage medium. Based on such an understanding, the technical solution of the present application, either substantively or in any part contributing to the prior art, or all or part of the technical solution, may be embodied in the form of a software product stored in a storage medium for executing all or part of the steps of the method of various embodiments of the present application. The storage medium includes: a USB flash disk, a removable hard disk, a read-only memory (ROM), a random access memory (RAM), an electrically erasable programmable ROM, registers, a hard disk, a removable magnetic disk, a CD-ROM, a magnetic or optical disk and the like may store program code.

Based on this, an embodiment of the present application also provides a computer-readable storage medium storing a read program of the memory data of a FPGA board, wherein the read program of the memory data of the FPGA board is executed by a processor as the steps of the method for reading the memory data of the FPGA board according to any one of the above embodiments.

The functions of the functional modules of the computer-readable storage medium according to the embodiments of the present application may be implemented according to the method in the above-mentioned method embodiments, and the implementation process thereof may be referred to the relevant description of the above-mentioned method embodiments and will not be described in detail herein.

It may be seen from the above that the embodiments of the present application effectively improve the reading data efficiency and resource utilization rate of a FPGA board, thereby improving the overall operating efficiency and reducing the system data processing delay.

It is understood that if the reading method of FPGA board memory data in the above embodiment is realized in the form of software functional units and sold or used as independent products, it may be stored in a computer-readable storage medium. Based on this understanding, the technical solution of the present application is essentially or the part that contributes to the prior art or the whole or part of the technical solution may be embodied in the form of a computer software product stored in a storage medium that carries out all or part of the steps of the various embodiments of the present application. The aforementioned storage media include: U disk, mobile hard disk, read-only memory (ROM), random access memory (RAM), electrically erasable programmable ROM, registers, hard disk, removable disk, CD-ROM, magnetic disk or optical disk and other media that may store program code.

Based on this, the embodiment of the present disclosure further provides a computer-readable storage medium having stored thereon a program for reading memory data of a FPGA board, wherein the program for reading memory data of the FPGA board when executed by a processor implements the steps of the method for reading memory data of the FPGA board according to any one of embodiments described above.

The functions of each function module of the computer-readable storage medium in the embodiment of the present disclosure may be realized in detail according to the method in the above embodiments, and the realization process may be referred to the relevant description in the above embodiments, which will not be repeated here.

As may be seen from the above, the embodiment of the present disclosure effectively improves the data reading efficiency and resource benefit rate of the FPGA board, thereby effectively improving the data reading efficiency and the resource utilization, thereby improving the overall operating efficiency and reducing the system data processing delay.

Each embodiment in the specification is described in a progressive way. Each embodiment focuses on the differences from other embodiments. The same and similar parts between each embodiment may be seen in each other. For the device disclosed in the embodiment, because it corresponds to the method of open embodiment, the description is relatively simple, and the relevant places may be seen in the method section.

A person skilled in the art may further realize that the units and algorithm steps of each example described in combination with the examples disclosed herein may be realized by electronic hardware, computer software or a combination of the two. In order to clearly explain the interchangeability of hardware and software, the composition and steps of each example have been described generally according to the functions in the above instructions. Whether these functions are implemented in hardware or software depends on the application and design constraints of the technical solution. A person skilled in the art may use different methods to implement the described functions for each application, but this implementation should not be considered beyond the scope of the present application.

The method, device and computer-readable storage medium for reading memory data of a FPGA board provided by the present application above are described in detail. In this specification, examples are used to explain the principle and implementation of the present application. The embodiments above are only used to help understand the method and core idea of the present application. It should be pointed out that for a person skilled in the art, some improvements and modifications may be made to the present application without deviating from the principle of the present application. These improvements and modifications also fall within the scope of protection of the claims in the present application.

The invention claimed is:

1. A method for reading memory data of a field programmable gate array (FPGA) board, wherein the method is based on a FPGA board, the method comprising:
   sending a quantity of controllers and a total quantity of double data rate (DDR) memories to a host end when receiving a hardware information acquisition request of the host end;
   performing data slice processing on data to be calculated based on a data space application request when the data space application request of the host end is received; wherein the data space application request carries a dedicated application space capacity of each DDR and the data to be calculated, and a total quantity of slices of the data to be calculated is not greater than the total quantity of the DDR memories; and
   transmitting each slicing data into a corresponding DDR space, and reading data and calculating same in parallel according to a data storage position of the slicing data in each DDR.

2. The method for reading memory data of the FPGA board according to claim 1, wherein performing data slice processing on the data to be calculated based on the data space application request comprises:
   reading a dedicated application space capacity of each DDR from the data space application request;
   determining whether the dedicated application space capacity of each DDR is same;
   on a condition that the dedicated application space capacity of each DDR is the same, equally dividing the data to be calculated into n parts, wherein n is a total quantity value of the DDR memories;
   on a condition that the dedicated application space capacity of each DDR is not the same, for the dedicated application space capacity of each DDR, cutting the data to be calculated into a data slice with a same value as the dedicated application space capacity of the current slicing of DDR, and setting identification information for the data slice to identify that the data in the data slice is stored in the memory space of the current slicing of DDR.

3. The method for reading memory data of the FPGA board according to claim 2, wherein transmitting each slicing data to the corresponding DDR space comprises:
   transmitting each slicing data to the corresponding DDR space through direct memory access.

4. The method for reading memory data of the FPGA board according to claim 3, wherein transmitting each slicing data into the corresponding DDR space, and reading data and calculating the same in parallel according to the data storage position of the slicing data in each DDR comprises:
   transmitting each slicing data to the corresponding DDR space, so that each DDR space transmits a structure address stored in a data source to a Kernel; and
   invoking the Kernel to read corresponding data in parallel according to a data storage address on each DDR for calculation.

5. The method for reading memory data of the FPGA board according to 4, wherein the FPGA board acquires storage position information about each data slice of the data to be calculated from a Kernel.

6. The method for reading memory data of the FPGA board according to claim 5, wherein the storage position information of each data slice carries identification information about the data to be calculated and identification information about a corresponding DDR.

7. The method for reading memory data of the FPGA board according to claim 1, wherein the hardware information comprises: the total quantity of DDR memories and a total quantity of controllers on the FPGA board.

8. A device for reading memory data of a FPGA board, based on a FPGA board, comprising:
   a data feedback module configured for sending a quantity of controllers and a total quantity of DDR memories to a host end when receiving a hardware information acquisition request of the host end;
   a data slice module configured for performing data slice processing on data to be calculated based on a data space application request when the data space application request of the host end is received; wherein the data space application request carries a dedicated application space capacity of each DDR and the data to be calculated, and a total quantity of slices of the data to be calculated is not greater than the total quantity of the DDR memories;
   a data storage module configured for transmitting each slicing data to a corresponding DDR space; and
   a data reading module configured for reading data and calculating same in parallel according to a data storage position of the slicing data in each DDR.

9. The device for reading memory data of the FPGA board according to claim 8, wherein the data slice module comprises:
   an information reading sub-module configured for reading a dedicated application space capacity of each DDR from a data space application request;
   a determination sub-module configured for determining whether the dedicated application space capacity of each DDR is same;
   an averaging slicing sub-module configured for, on a condition that the dedicated application space capacity of each DDR is the same, equally dividing the data to be calculated into n parts, wherein n is a total quantity value of the DDR memories; and
   a matching slicing sub-module configured for, on a condition that the dedicated application space capacity of each DDR is not the same, for the dedicated application space capacity of each DDR, cutting the data to be calculated into a data slice with a same value as the dedicated application space capacity of the current slicing of DDR, and setting identification information for the data slice to identify that the data in the data slice is stored in the memory space of the current slicing of DDR.

10. The device for reading memory data of the FPGA board according to claim 9, wherein the data reading module comprises:
    an address feedback sub-module configured for transmitting each slicing data to the corresponding DDR space, so that each DDR space transmits a structure address stored in a data source to a Kernel; and
    a data parallel reading sub-module configured for invoking the Kernel to read corresponding data in parallel according to a data storage address on each DDR for calculation.

11. The device for reading memory data of the FPGA board according to claim 8, wherein the hardware information comprises: the total quantity of DDR memories and a total quantity of controllers on the FPGA board.

12. A method for reading memory data of a FPGA board, based on a host end, comprising:
   acquiring a quantity of controllers and a total quantity of DDR memories of the FPGA board;
   determining a dedicated application space capacity of each DDR based on the total quantity of the DDR memories and the quantity of the controllers; and
   invoking a data request function of an open computing language (Opencl) to send a data space application request to the FPGA board, wherein the data space application request carries a dedicated application space capacity of each DDR and data to be calculated, so that the FPGA board performs data slice processing on the data to be calculated and stores a corresponding DDR space.

13. The method for reading memory data of the FPGA board according to claim 12, wherein determining a dedicated application space capacity of each DDR based on the total quantity of the DDR memories and the quantity of the controllers comprises: based on the quantity of controllers, the total quantity of DDR memories and the capacity calculation of the space occupied by the data to be calculated, the FPGA board is applied by the host end for the capacity calculation of the space occupied by separately storing the data to be calculated in a plurality of pieces of DDR memories.

14. The method for reading memory data of the FPGA board according to claim 12, wherein the dedicated application space capacity of each DDR is used for storing a corresponding portion of the data to be calculated.

15. The method for reading memory data of the FPGA board according to claim 12, wherein the data to be calculated is evenly divided into all the DDRs in the FPGA board or stored in several DDRs.

16. A reading device for memory data of a FPGA board, comprising a processor, when executing a computer program stored in a memory, implements the steps of the method for reading data in a FPGA board memory according to claim 12.

17. The reading device for memory data of a FPGA board according to claim 16, wherein determining a dedicated application space capacity of each DDR based on the total quantity of the DDR memories and the quantity of the controllers comprises: based on the quantity of controllers, the total quantity of DDR memories and the capacity calculation of the space occupied by the data to be calculated, the FPGA board is applied by the host end for the capacity calculation of the space occupied by separately storing the data to be calculated in a plurality of pieces of DDR memories.

18. The reading device for memory data of a FPGA board according to claim 16, wherein the dedicated application space capacity of each DDR is used for storing a corresponding portion of the data to be calculated.

19. The reading device for memory data of a FPGA board according to claim 16, wherein the data to be calculated is evenly divided into all the DDRs in the FPGA board or stored in several DDRs.

20. A computer-readable storage medium having stored thereon a program for reading memory data of a FPGA board, wherein the program for reading memory data of the FPGA board when executed by a processor implements the steps of the method for reading memory data of the FPGA board according to claim 12.

* * * * *